United States Patent
Hashimoto et al.

(10) Patent No.: US 12,140,949 B2
(45) Date of Patent: *Nov. 12, 2024

(54) VEHICLE CONTROL DEVICE, VEHICLE CONTROL METHOD AND COMPUTER-READABLE STORAGE MEDIUM

(71) Applicant: TOYOTA JIDOSHA KABUSHIKI KAISHA, Toyota (JP)

(72) Inventors: Ryuta Hashimoto, Susono (JP); Hiroki Fukuda, Sunto-gun (JP); Akira Ito, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,494

(22) Filed: Sep. 7, 2023

(65) Prior Publication Data

US 2023/0418290 A1  Dec. 28, 2023

Related U.S. Application Data

(63) Continuation of application No. 17/529,977, filed on Nov. 18, 2021, now Pat. No. 11,789,446, which is a
(Continued)

(30) Foreign Application Priority Data

Feb. 26, 2018  (JP) .................................. 2018-032309
Sep. 25, 2018  (JP) .................................. 2018-178849

(51) Int. Cl.
*G05D 1/00*  (2024.01)
*B60Q 9/00*  (2006.01)
(Continued)

(52) U.S. Cl.
CPC ............ *G05D 1/0061* (2013.01); *B60Q 9/00* (2013.01); *B60W 30/18163* (2013.01);
(Continued)

(58) Field of Classification Search
CPC .................................................... G05D 1/0061
See application file for complete search history.

(56) References Cited

U.S. PATENT DOCUMENTS 10,858,007 B2 *  12/2020  Hashimoto ............ B60Q 1/346
10,942,038 B2 *  3/2021  Gibson .............. G01C 21/3492
(Continued)

FOREIGN PATENT DOCUMENTS

| JP | 2016-071514 A | 5/2016 |
| JP | 2017-132408 A | 8/2017 |
| JP | 2017-194784 A | 10/2017 |

OTHER PUBLICATIONS

Communication dated Oct. 27, 2020 from the US Patent Office in U.S. Appl. No. 16/284,287.
(Continued)

*Primary Examiner* — Michael A Berns
(74) *Attorney, Agent, or Firm* — Sughrue Mion, PLLC

(57) ABSTRACT

When a subject vehicle reaches a first position of an interflow zone within an interflow lane, it is judged whether a condition for automatic interflow is satisfied. When it is judged that the condition for automatic interflow is not satisfied at the first position, a notification for urging manual interflow by a driver is stated to execute. When it is judged that the condition for automatic interflow is satisfied at the first position, the automatic interflow is stared to execute.

8 Claims, 10 Drawing Sheets

Related U.S. Application Data continuation of application No. 16/862,817, filed on Apr. 30, 2020, now Pat. No. 11,215,992, which is a continuation of application No. 16/284,287, filed on Feb. 25, 2019, now Pat. No. 11,054,823.

(51) Int. Cl.
  *B60W 30/18* (2012.01)
  *B60W 50/08* (2020.01)
  *B60W 50/14* (2020.01)

(52) U.S. Cl.
  CPC .......... *B60W 50/082* (2013.01); *B60W 50/14* (2013.01); *G05D 1/0088* (2013.01); *G05D 1/0212* (2013.01); *B60W 2520/10* (2013.01); *B60W 2552/00* (2020.02); *B60W 2554/80* (2020.02); *B60W 2720/106* (2013.01)

(56) References Cited

U.S. PATENT DOCUMENTS

| | | | | |
|---|---|---|---|---|
| 10,983,516 | B2 * | 4/2021 | Aoki | B60W 60/0011 |
| 11,054,823 | B2 * | 7/2021 | Hashimoto | B60W 30/18154 |
| 11,066,073 | B2 * | 7/2021 | Ishioka | B60W 30/09 |
| 11,186,279 | B2 * | 11/2021 | Fukuda | B60W 30/12 |
| 11,215,992 | B2 * | 1/2022 | Hashimoto | G05D 1/0212 |
| 11,230,291 | B2 * | 1/2022 | Fukuda | G05D 1/0219 |
| 11,299,160 | B2 * | 4/2022 | Nishiguchi | B60W 10/18 |
| 11,681,290 | B2 | 6/2023 | Hashimoto et al. | |
| 2016/0214612 | A1 | 7/2016 | Kashiba et al. | |
| 2017/0234689 | A1 | 8/2017 | Gibson et al. | |
| 2018/0178796 | A1 | 6/2018 | Fukuda et al. | |
| 2019/0092333 | A1 | 3/2019 | Ishioka | |
| 2019/0225224 | A1 | 7/2019 | Hashimoto et al. | |
| 2019/0227544 | A1 | 7/2019 | Aoki et al. | |
| 2019/0265697 | A1 | 8/2019 | Hashimoto et al. | |
| 2020/0247413 | A1 | 8/2020 | Fukuda et al. | |
| 2020/0257290 | A1 | 8/2020 | Hashimoto et al. | |
| 2022/0075374 | A1 | 3/2022 | Hashimoto et al. | |
| 2023/0418290 | A1 * | 12/2023 | Hashimoto | G05D 1/0088 |

OTHER PUBLICATIONS

Notice of Allowance dated Feb. 23, 2023 issued by the United States Patent and Trademark Office in U.S. Appl. No. 17/529,888.

Office Action dated Nov. 14, 2022 issued by the United States Patent and Trademark Office in U.S. Appl. No. 17/529,888.

Non-Final Office Action issued Mar. 16, 2023 in U.S. Appl. No. 17/529,977.

Notice of Allowance issued Jun. 7, 2023 in U.S. Appl. No. 17/529,977.

* cited by examiner

S10 ARE CONDITIONS FOR MANUAL INTERFLOW SATISFIED IN FRONT OF POSITION PNO?
S11 START AUTOMATIC INTERFLOW
S12 ARE CONDITIONS FOR MANUAL INTERFLOW SATISFIED AT POSITION PNO?
S13 START GENTLE DECELERATION
S14 HAS SUBJECT VEHICLE REACHED POSITION PGU WITHOUT MANUAL INTERFLOW?
S15 START FULL DECELEATION

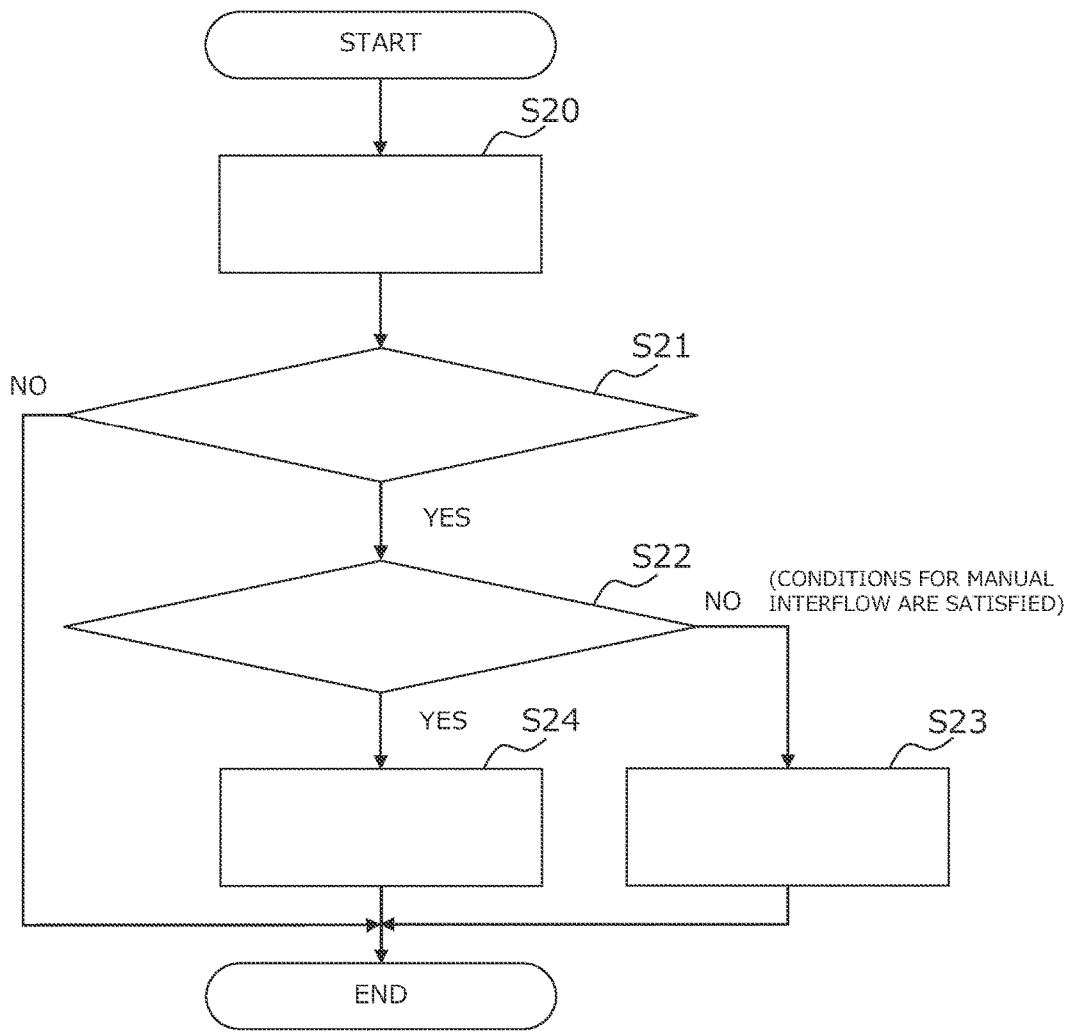

S20 POSITION PNO IS PROVISIONALLY SET TO POINT PRIOR TO α SECONDS FROM POSITION PGU
S21 HAS SUBJECT VEHICLE REACHED POSITION PNO WITHOUT AUTOMATIC INTERFLOW?
S22 ARE CONDITIONS FOR AUTOMATIC INTERFLOW SATISFIED AT POSITION PNO?
S23 POSITION PNO IS FORMALLY SET TO POINT PRIOR TO α SECONDS FROM POSITION PGU
S24 POSITION PNO IS FORMALLY SET TO POINT PRIOR TO β SECONDS FROM POSITION PGU

*FIG. 7*

S30 IS WHOLE LENGTH OF INTERFLOW ZONE SHORTER THAN THAT OF NOTIFICATION AREA?
S31 START DECELERATION

S20 POSITION PNO IS PROVISIONALLY SET TO POINT PRIOR TO α SECONDS FROM POSITION PGU
S40 IS MULTIPULED VALUE OF WHOLE LENGTH OF NOTIFICATION AREA AND COEFFICIENT C LONGER THAN WHOLE LENGTH OF INTERFLOW ZONE?
S41 POSITION PNO IS CHANGED TO POINT PRIOR TO γ SECONDS FROM POSITION PGU

VEHICLE CONTROL DEVICE, VEHICLE CONTROL METHOD AND COMPUTER-READABLE STORAGE MEDIUM

RELATED APPLICATIONS

The present disclosure is a continuation of U.S. application Ser. No. 17/529,977, filed on Nov. 18, 2021 (allowed), which is a continuation of U.S. application Ser. No. 16/862,817, filed on Apr. 30, 2020 (now U.S. Pat. No. 11,215,992 issued Jan. 4, 2022), which is a continuation of U.S. application Ser. No. 16/284,287, filed Feb. 25, 2019 (now U.S. Pat. No. 11,054,823 issued Jul. 6, 2021).

TECHNICAL FIELD

The present disclosure relates to a vehicle control device, a vehicle control method and a computer-readable storage medium.

BACKGROUND

JP2016-71514A discloses a travel support control device which is configured to control automatic driving of a vehicle. The control device judges whether or not conditions on lane change are satisfied based on various information. In addition, if the control device judges that the lane change conditions are satisfied, it proposes lane change to a driver of the vehicle. Furthermore, the control device executes necessary processing for automatic lane change when consent on the proposal is obtained from the driver.

As the automatic lane change, automatic interflow from an interflow lane to a main lane is supposed. When the automatic interflow is executed, it is judged whether or not conditions for automatic interflow to the main lane are satisfied based on various information. However, unlike normal lane change, the interflow has a constraint on length of the interflow lane. Therefore, even if the conditions for automatic interflow are satisfied and also consent on the automatic interflow is obtained from the driver, there is a case where another proposal to the driver is additionally required to issue for handover from the automatic interflow to manual interflow.

However, the proposal for handover of a central player of vehicle control has the following problems. That is, when the control device tries to execute the automatic interflow as much as possible in the interflow lane, it fails to get much time for executing the proposal for handover. Conversely, when the control device tries to set much time for executing the proposal for handover as much as possible, it fails to get much time for the automatic interflow.

The present disclosure addresses the above described problem, and an object of the present disclosure is, to provide a vehicle control system capable of ensuring compatibility between possibility of the automatic interflow in the interflow lane and securing of running safety in the interflow lane.

SUMMARY

A first aspect of the present disclosure is a vehicle control device for solving the problem described above and has the following features.

The vehicle control device is a device to control automatic interflow of a subject vehicle from an interflow lane to a main lane. The vehicle control device comprises a processor and a memory device in which a computer-executable program is stored.

When the program is executed by the processor, the processor is configured to:
  judge whether or not a predetermined condition for automatic interflow is satisfied when the subject vehicle reaches a first position of an interflow zone within the interflow lane; and
  start to execute a notification for urging manual interflow by a driver when it is judged that the condition for automatic interflow is not satisfied at the first position, while starting to execute the automatic interflow when it is judged that the condition for automatic interflow is satisfied at the first position.

A second aspect of the present disclosure has the following features according to the first aspect.

When the program is executed by the processor, the processor is further configured to:
  during the subject vehicle travels along the interflow lane, set the first position based on map information and information on position and orientation of the subject vehicle;
  judge whether or not a predetermined condition for automatic interflow is satisfied when the subject vehicle reaches a position located in front of the first position; and
  start to execute the automatic interflow when it is judged that the condition for automatic interflow is satisfied at the position in front of the first position.

The judgement at the first position as to whether or not the condition for automatic interflow is satisfied is executed when it is judged that the condition for automatic interflow is not satisfied at the position in front of the first position.

A third aspect of the present disclosure has the following features according to the first aspect.

When the program is executed by the processor, the processor is further configured to:
  during the subject vehicle travels along the interflow lane, set the first position based on map information and information on position and orientation of the subject vehicle;
  continuously judge whether or not a predetermined condition for automatic interflow is satisfied before the subject vehicle reaches the first position; and
  start to execute the automatic interflow when it is judged that the condition for automatic interflow is satisfied before the subject vehicle reaches the first position.

The judgement at the first position as to whether or not the condition for automatic interflow is satisfied is executed when it is judged that the condition for automatic interflow is not satisfied before the subject vehicle reaches the first position.

A fourth aspect of the present disclosure has the following features according to the first aspect.

The condition for automatic interflow includes:
  (i) there is no other vehicle interfering with an interfluent motion of the subject vehicle;
  (ii) a blinker lamp of the subject vehicle has been lighted for a predetermined time;
  (iii) speed of the subject vehicle at a proximal end of the interflow zone is faster than or equal to a specified speed;
  (iv) a driving force for travel output device of the subject vehicle, a steering device of the subject vehicle and a brake device of the subject vehicle are not abnormal.

A fifth aspect of the present disclosure has the following features according to the first aspect.

When the program is executed by the processor, the processor is further configured to:
when it is judged that the condition for automatic interflow is satisfied at the first position, temporarily suspend to start to execute the notification while setting a second position between the first position and a distal end of the interflow zone; and
start to execute the notification when the start of the notification is suspended and the subject vehicle reaches the second position.

A sixth aspect of the present disclosure is a vehicle control method for solving the problem described above and has the following features.

The vehicle control method is a method to control automatic interflow of a subject vehicle from an interflow lane to a main lane. The vehicle control method comprises the steps of
judging whether or not a predetermined condition for automatic interflow is satisfied when the subject vehicle reaches a first position of an interflow zone within the interflow lane; and
starting to execute a notification for urging manual interflow by a driver when it is judged that the condition for automatic interflow is not satisfied at the first position, while starting to execute the automatic interflow when it is judged that the condition for automatic interflow is satisfied at the first position.

A seventh aspect of the present disclosure has the following features according to the sixth aspect.

The vehicle control method further comprises the steps of
when it is judged that the condition for automatic interflow is satisfied at the first position, temporarily suspend to start to execute the notification while setting a second position between the first position and a distal end of the interflow zone; and
starting to execute the notification when the start of the notification is suspended and the subject vehicle reaches the second position.

An eighth aspect of the present disclosure is a non-transitory computer-readable storage medium for solving the problem described above and has the following features.

The computer-readable storage medium is a storage medium that causes a computer to execute process to control automatic interflow of a subject vehicle from an interflow lane to a main lane.

The process comprising:
judging whether or not a predetermined condition for automatic interflow is satisfied when the subject vehicle reaches a first position of an interflow zone within the interflow lane; and
starting to execute a notification for urging manual interflow by a driver when it is judged that the condition for automatic interflow is not satisfied at the first position, while starting to execute the automatic interflow when it is judged that the condition for automatic interflow is satisfied at the first position.

According to the first, sixth or eighth aspect, the notification for urging manual interflow by a driver is started to execute when it is judged that the condition for automatic interflow is not satisfied at the first position. On the other hand, when it is judged that the condition for automatic interflow is satisfied at the first position, the start to execute the automatic interflow.

According to the second aspect, the judgement as to whether or not a predetermined condition for automatic interflow is satisfied is executed when the subject vehicle reaches a position located in front of the first position.

According to the third aspect, the judgement as to whether or not a predetermined condition for automatic interflow is satisfied is continuously executed before the subject vehicle reaches the first position.

According to the fourth aspect, it is possible to execute the judgement as to whether or not a predetermined condition for automatic interflow is satisfied.

According to the fifth or seventh aspect, when it is judged that the condition for automatic interflow is satisfied at the first position, the start to execute the notification for urging manual interflow is temporally suspended whereas this execution of the notification is started when the subject vehicle reaches the second position. Hence, it is possible to ensure the compatibility between the possibility of the automatic interflow in the interflow lane and the securing of the running safety in the interflow lane.

BRIEF DESCRIPTION OF DRAWINGS

FIG. 7 is a flowchart for describing notification position setting processing according to the first embodiment;

DESCRIPTION OF EMBODIMENT

Figure 1:
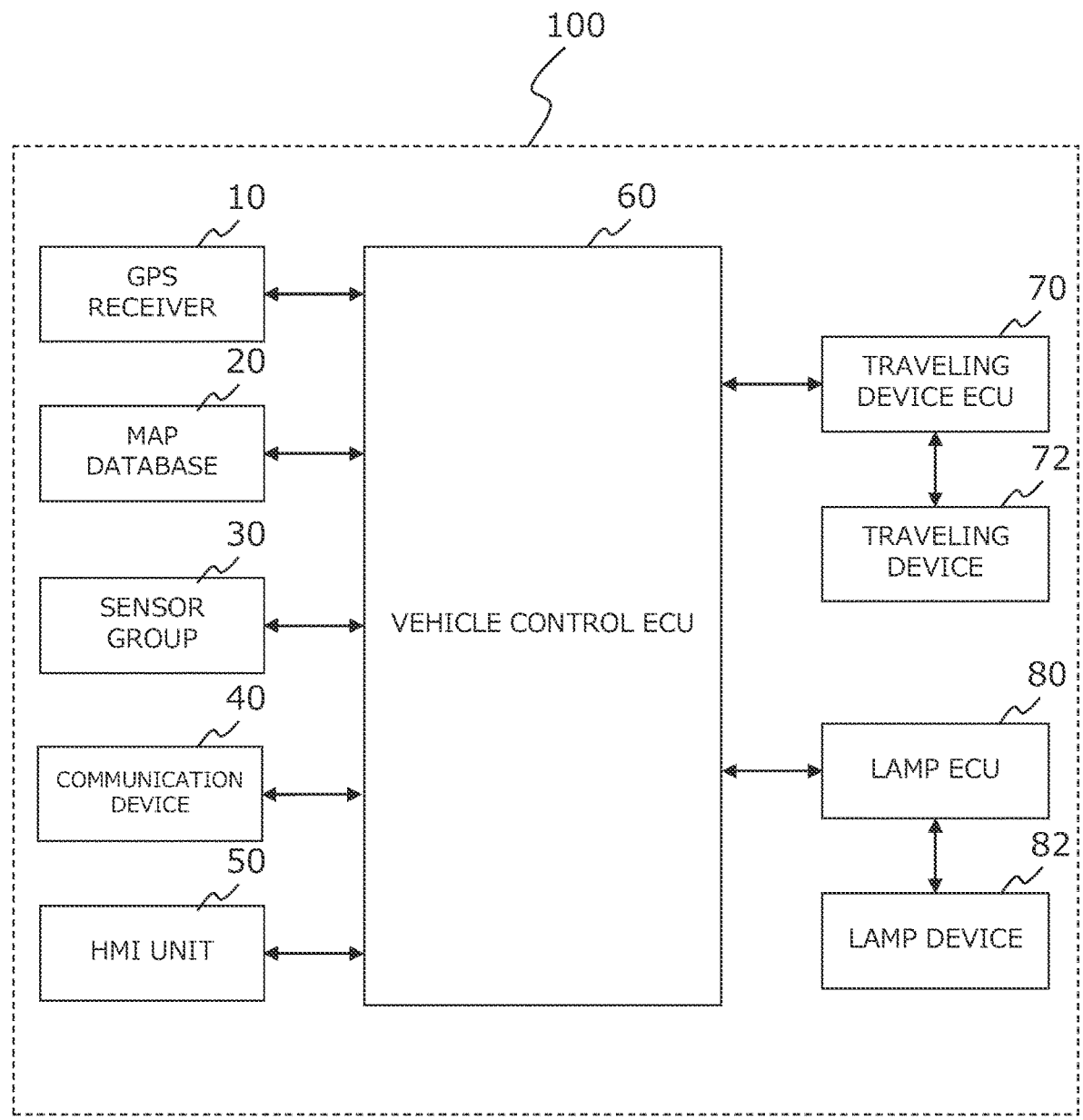
FIG. 1 is a block diagram for showing a configuration example of a vehicle control system according to a first or a second embodiment of the present disclosure.

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

A first embodiment of the present disclosure will be described with reference to FIGS. 1 to 8.

1. Configuration of Vehicle Control System

FIG. 1 is a block diagram for showing a configuration example of the vehicle control system 100 according to the first embodiment. The system 100 is mounted on a vehicle and is configured to control automatic driving of the vehicle. A vehicle equipped with the system 100 is referred to as a "subject vehicle M". The subject vehicle M is, for example, a vehicle powered by an internal combustion engine such as a diesel engine or a gasoline engine, an electronic vehicle powered by an electric motor, and a hybrid vehicle equipped with the engine and the electric motor. The electric motor is driven by batteries such as secondary batteries, hydrogen fuel cells, metal fuel cells and alcohol fuel cells.

The system 100 shown in FIG. 1 includes a GPS (Global Positioning System) receiver 10, a map database 20, a sensor group 30, a communication device 40, an HMI (Human Machine Interface) unit 50, a vehicle control ECU (Electronic Control Unit) 60, a traveling device ECU 70, a traveling device 72, a lamp ECU 80 and a lamp device 82.

The GPS receiver 10 is a device that receives signals from three or more GPS satellites. The GPS receiver 10 calculates position and orientation of the subject vehicle M based on the received signal. The GPS receiver 10 transmits the calculated information (hereinafter also referred to as "information on position and orientation") to the vehicle control ECU 60.

The map database 20 stores data of map information. The data of the map information includes, for example, data on positions such as roads, intersections, interfluent points and divergent points, data on road shape (e.g., road type such as straight and curve, road width, road gradient and road curvature), data on road type (e.g., expressway, toll road and national highway), data on boundary position of lane. The boundary position is represented by a set of plural points or plural lines. The map database 20 is stored in a predetermined storage device (e.g., a hard disk and a flash memory).

The sensor group 30 detect circumstances and traveling state of the subject vehicle M. The sensor group 30 transmit the detected information (hereinafter also referred to as "information on sensor detection") to the vehicle control ECU 60.

The sensor group 30 detecting the circumstances of the subject vehicle M includes a LIDER (Laser Imaging Detection and Ranging), a millimeter wave radar and a camera. The LIDER uses light to detect a landmark around the subject vehicle M. The landmark around the subject vehicle M includes a moving landmark and a stationary landmark. Examples of the moving landmark include a surrounding vehicle, a motorcycle, a bicycle and a walker. Information on the moving landmark includes position, speed and size of the moving landmark. Examples of the stationary landmark include a roadside object, a white line and a traffic sign. Information on the stationary landmark includes position and size of the stationary landmark. The millimeter wave radar uses radio waves to detect the landmark around the subject vehicle M. The camera images situation around the subject vehicle M.

The sensor group 30 detecting traveling state of the subject vehicle M includes a vehicle speed sensor, a brake sensor, an accelerator position sensor, a steering torque sensor and a blinker sensor. The vehicle speed sensor detects speed of the subject vehicle M. The brake sensor detects an operation amount of a brake pedal. The accelerator position sensor detects the operation amount of an accelerator pedal. The steering torque sensor detects rotation angle (steering angle) of a steering wheel. The blinker sensor detects operation of a blinker switch.

The communication device 40 executes Vehicle-to-Everything communication (e.g., Vehicle-to-Vehicle communication and Vehicle-to-Infrastructure communication). Specifically, the communication device 40 executes V2V communication (i.e., Vehicle-to-Vehicle communication) with other vehicles. In addition, the communication device 40 executes V2I communication (i.e., Vehicle-to-Infrastructure communication) with the surrounding infrastructures. Through Vehicle-to-Everything communication, the communication device 40 obtains information on surrounding environment of the subject vehicle OV. The communication device 40 sends the obtained information (hereinafter also referred to as "communication information") to the vehicle control ECU 60.

The HMI unit 50 is an interface for providing information to the driver and accepting information from the driver. For example, the HMI unit 50 has an input device, a display device, a speaker and a microphone. Examples of the input device includes a touch panel, a keyboard, a switch, and a button. The driver is able to input information to the HMI unit 50 using the input device. The HMI unit 50 transmits information input from the driver to the vehicle control ECU 60.

The vehicle control ECU 60 executes automatic driving control in which the automatic driving of the subject vehicle M is controlled. Typically, the vehicle control ECU 60 is a microcomputer including a processor, a memory, and an input and output interface. The vehicle control ECU 60 receives various information via the input and output interface. Then, the vehicle control ECU 60 executes the automatic driving control based on the received information.

In the first embodiment, an automatic interflow is considered among the automatic driving. In the automatic interflow, a lane along which the subject vehicle M travels (hereinafter also referred to as a "traveling lane") is automatically changed from an interflow lane to a main lane. Upon the automatic interflow, the vehicle control ECU 60 generates the information on interflow necessary for the automatic interflow and outputs it to the traveling device ECU 70 and the lamp ECU 80.

The traveling device ECU 70 is a microcomputer having a typical configuration similar to that of the vehicle control ECU 60. The traveling device ECU 70 is composed of a plurality of ECUs. These ECUs respectively control the traveling device 72 according to the information on interflow transmitted from the vehicle control ECU 60. The traveling device 72 is electronically controlled and includes a driving force for travel output device, a steering device and a brake device. The driving force for travel output device is a power source which is configured to generate driving force. The steering device which is configured to steer wheels. The brake device generates a braking force.

The lamp ECU 80 is a microcomputer having a typical configuration similar to that of the vehicle control ECU 60. The lamp ECU 80 controls lighting motion of the lamp device 82 according to the information on interflow transmitted from the vehicle control ECU 60. The lamp device 82 is electronically controlled and includes a headlight, a backlight, a blinker lamp and a brake lamp.

2. Configuration of Vehicle Control ECU 60

Figure 2:
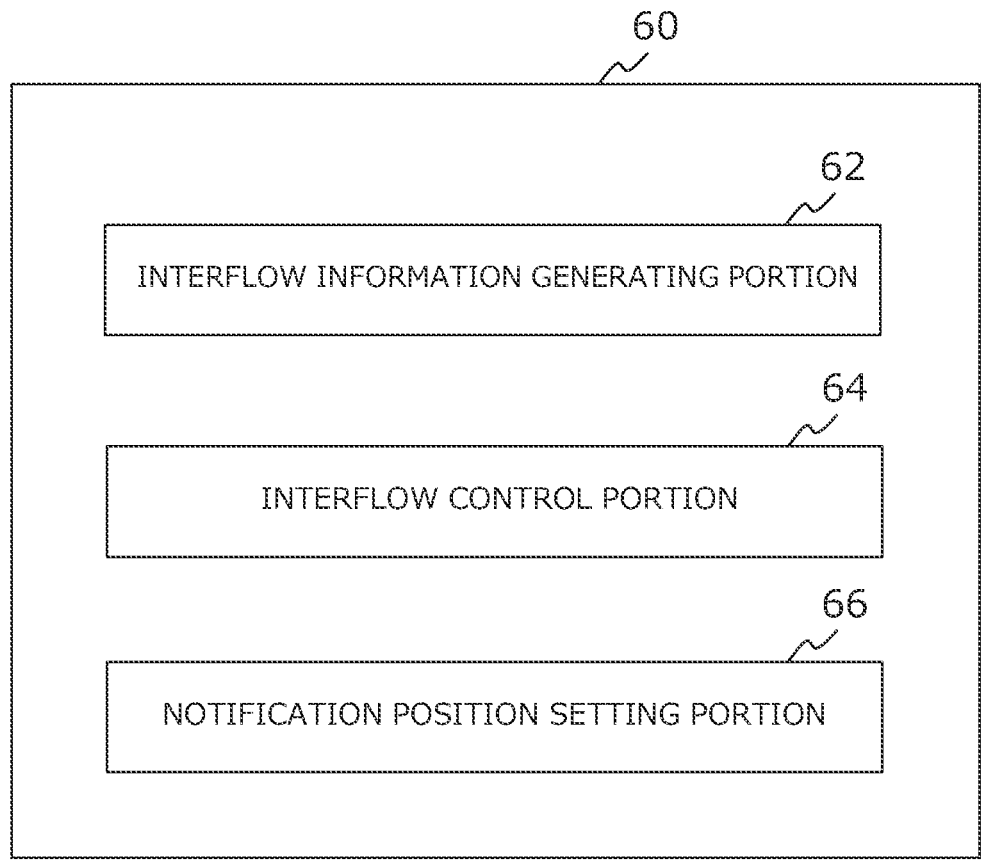
FIG. 2 is a block diagram for showing a functional configuration example of a vehicle control ECU.

FIG. 2 is a block diagram for showing a configuration example of automatic interflow function of the vehicle control ECU 60. As shown in FIG. 2, the vehicle control ECU 60 includes an interflow information generating portion 62, an interflow control portion 64 and a notification position setting portion 66. These function blocks are realized when the processor of the vehicle control ECU 60 executes control program stored in the memory. The control program may be stored in a computer readable recording medium.

2.1 Interflow Information Generating Portion 62

The portion 62 executes processing to generate the information on interflow necessary for the automatic interflow based on driving environment information. The driving environment information is information indicating driving environment of the subject vehicle M. The driving environment information is a generic name of the information on position and orientation, the map information, the information on sensor detection and the communication information. The information on interflow includes information on traveling path, information on target stop position, information on give-up position, and information on manual interflow notification position.

The information on traveling path is information on a traveling pas from the interflow lane to the main lane. The information on traveling path is generated based on, for example, the driving environment information. The traveling pas is defined a set of target positions to which a reference position of the subject vehicle M (e.g., a center of gravity of the subject vehicle M or a center of a rear wheel axis) has to reach during the automatic traveling along the interflow lane and during the automatic interflow. The traveling pas is set each time a predetermined time elapses with current time as a reference. A method of setting such traveling pas is not particularly limited, and known setting methods are applicable to the first embodiments. Note that, in the first embodiment, the traveling pas is set regardless of a satisfaction of conditions for automatic interflow described later. That is, the information on traveling path is generated each time a predetermined time elapses while the subject vehicle M travels along the interflow lane.

The information on target stop position, the information on give-up position and the information on manual interflow notification position correspond to a target stop position PST, a give-up position PGU and a manual interflow notification position PNO, respectively. These position PST, PGU and PNO are set within the interflow lane. These information are generated based on, for example, the information on position and orientation and the map information. Like the information on traveling path, these information are generated each time a predetermined time elapses while the subject vehicle M travels along the interflow lane. The positions PNO, PGU and PST will be described with reference to FIGS. 3 and 4.

Figure 3:
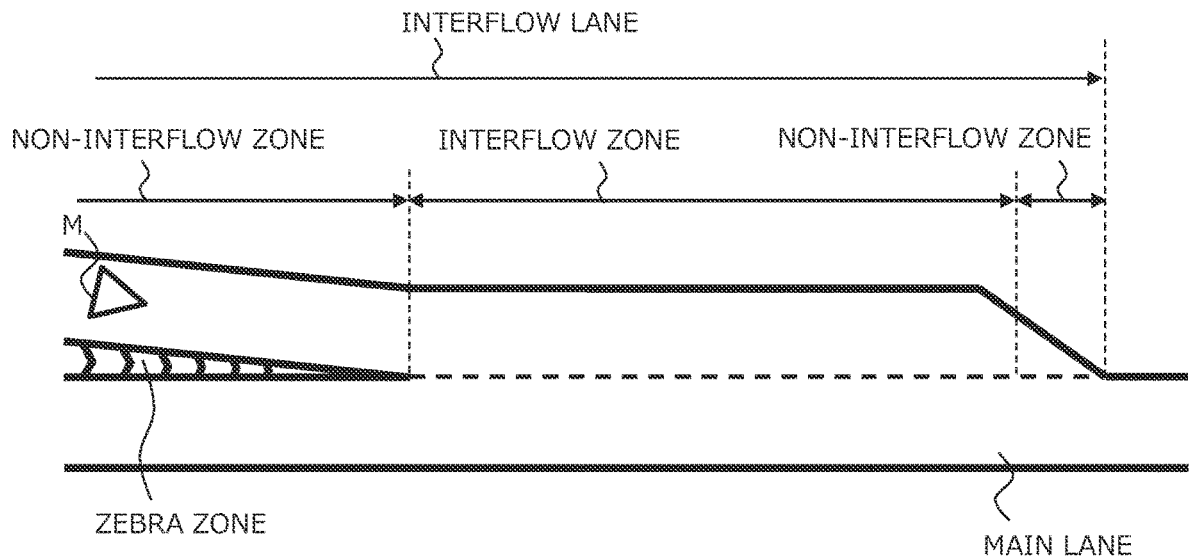
FIG. 3 is a diagram for describing an interflow zone and a non-interflow zone within an interflow lane.

As shown in FIG. 3, the interflow lane is divided into an interflow zone and a non-interflow zone. The interflow zone is a zone adjacent to the main lane. Also, the interflow zone is a zone where an interflow to the main lane by the subject vehicle M is physically possible. One end of a boundary between the interflow zone and the non-interflow zone is located, for example, at a tip of a zebra zone (a buffer zone). As another example, one end of the boundary is located at the tip of a roadside structure located between the main lane and the interflow lane. The other end of the boundary is located at a tip of the interflow lane. The boundary at the tip is, for example, a position whose lane width in a transverse direction coincides with a vehicle width of a general vehicle. The positions PNO, PGU and PST locates between a distal end and a proximal end of the interflow zone.

Figure 4:
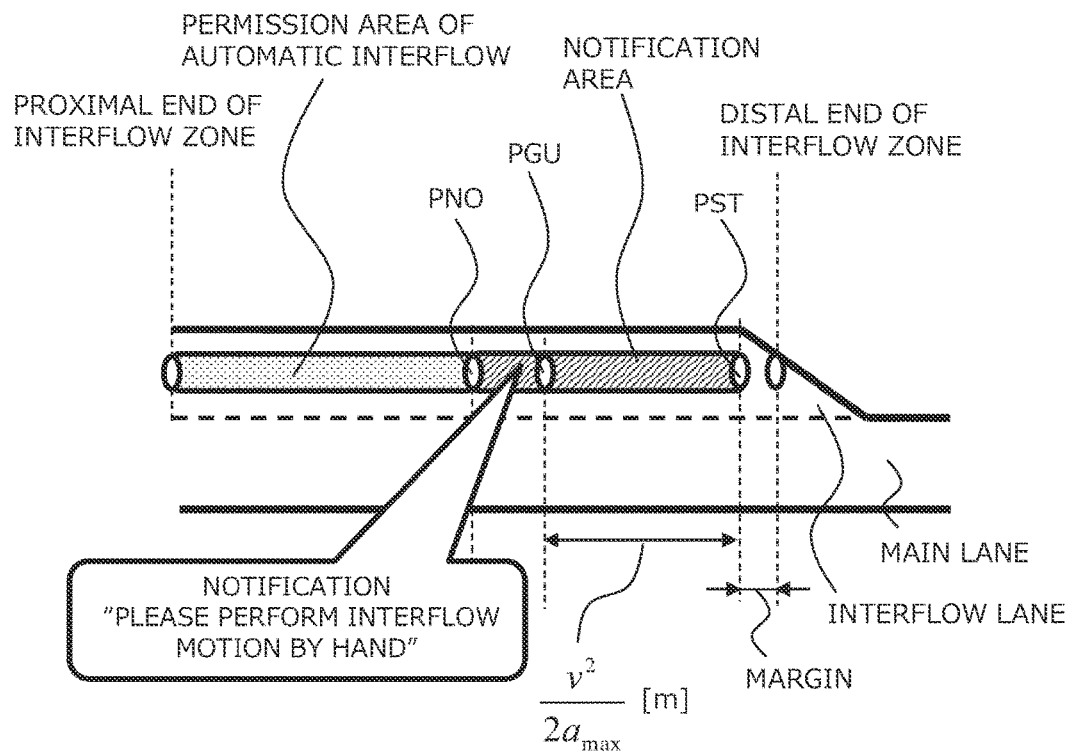
FIG. 4 is a diagram for describing a target stop position PST, a give-up position PGU and a manual interflow notification position PNO set in the interflow zone.

FIG. 4 is an enlarged view of the periphery of the interflow zone shown in FIG. 3. The position PST is defined as a point where the subject vehicle M must stop finally, assuming that the subject vehicle M travels along the interflow lane without executing the automatic interflow. The position PST is defined as a point away from the distal end of the interflow zone by a margin (e.g., 5 meters). The position PGU is defined as a point where the subject vehicle M have to give up the automatic interflow. The position PGU is, for example, a position away from the position PST by the traveling distance ($v^2/2a_{max}$) when the subject vehicle M travels at speed v is decelerated with maximum deceleration $a_{max}$. The position PNO is defined as a point where a notification for urging manual interflow by the driver (e.g., "please perform an interflow motion by hand") is started to execute as a preliminary stage to abandon the automatic interflow. The position PNO is, for example, a point prior to a seconds (e.g., 4.0 seconds) from which the subject vehicle M traveling at the speed v reaches the position PGU.

In the following description, the notification for urging manual interflow by the driver is also referred to a "manual interflow notification". An area from the position PNO to the position PST is also referred to a "notification area" where the manual interflow notification is notified in principle. An area from the proximal end of the interflow zone to the position PNO is also referred to as a "permission area of the automatic interflow" where the automatic interflow is executed in principle.

2.2 Interflow Control Portion 64

The portion 64 executes processing to control the motion of the subject vehicle M traveling along the interflow lane (hereinafter also referred to as "interflow control processing") based on the driving environment information and the information on interflow. The interflow control processing will be described in detail with reference to FIG. 5.

Figure 5:
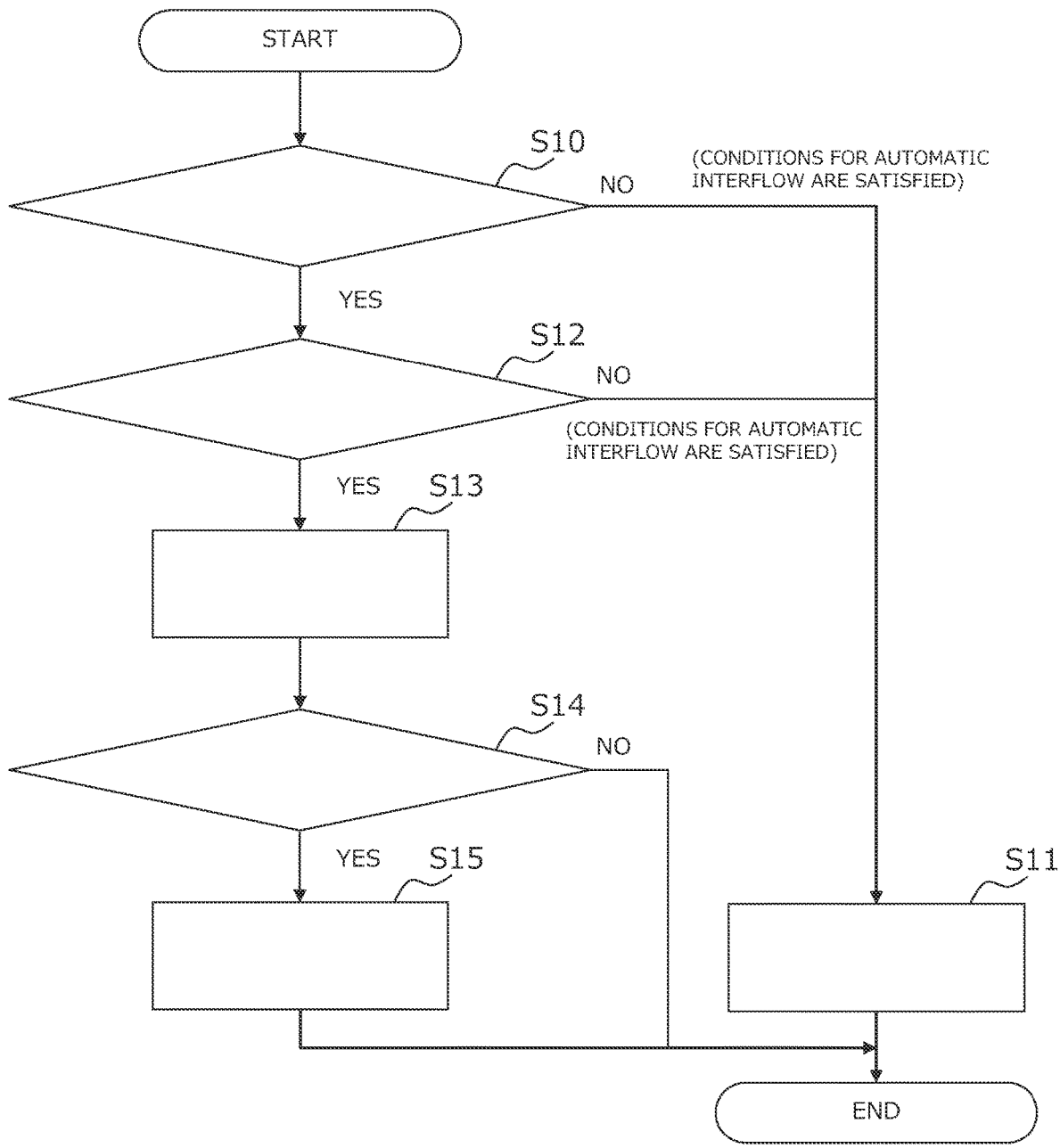
FIG. 5 is a flowchart for describing interflow control processing according to the first embodiment.

FIG. 5 is a flowchart for describing the interflow control processing according to the first embodiment. In the routine shown in FIG. 5, first, it is judged whether or not conditions for manual interflow are satisfied at a position in front of the position PNO (step S10). Specifically, the position in front of the position PNO is an arbitrary position within the permission area of the automatic interflow. The arbitrary position may be two or more positions. That is, the processing of the step S10 may be repeated two or more times.

The conditions for manual interflow is the following conditions C1 to C4.

C1: There is another vehicle that interferes with an interfluent motion of the subject vehicle M.
C2: The blinker lamp has not been lighted for a predetermined time.
C3: The speed of the subject vehicle M at the proximal end of the interflow zone is less than a specified speed.
C4: The driving force for travel output device, the steering device or the brake device is abnormal.

Figure 6:
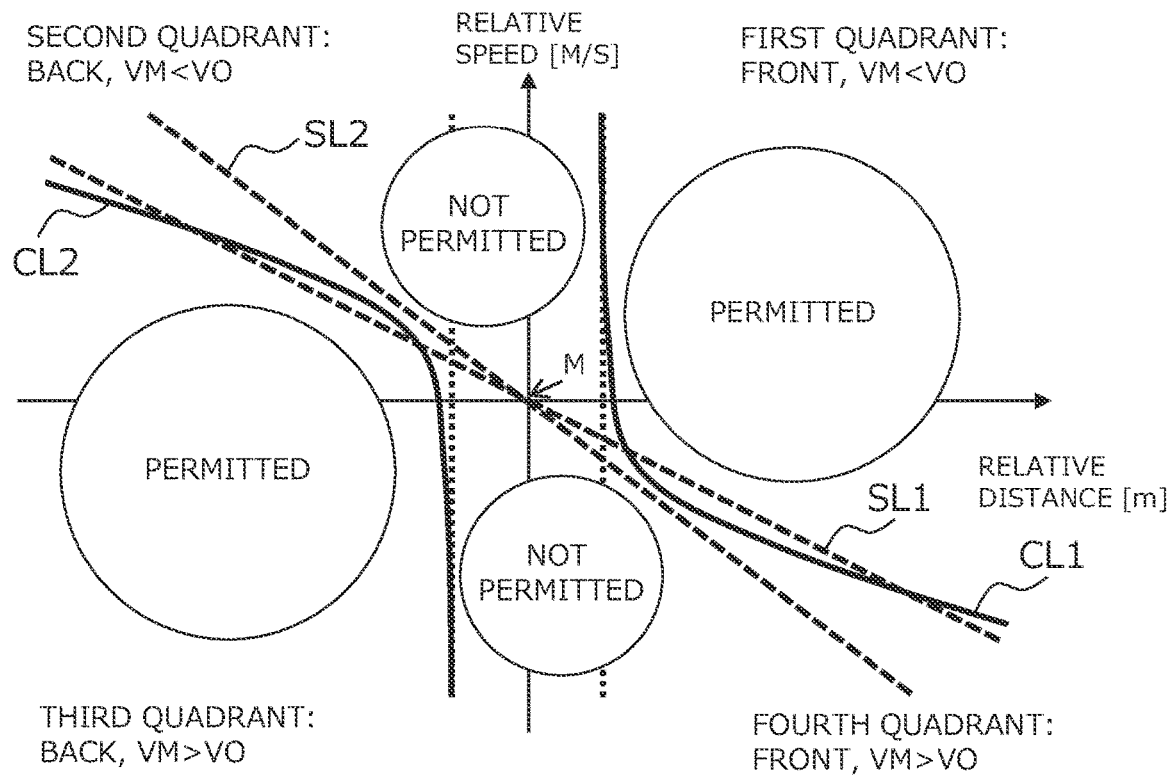
FIG. 6 is a diagram for describing an example of judgement criteria as to whether or not there is another vehicle that interferes with interfluent motion.

The satisfaction of the conditions C1 to C4 is judged based on the driving environment information. The satisfaction of the condition C1 is judged based on relative information (i.e., relative speed and relative distance) of other vehicles included in the information on sensor detection, for example. The term "other vehicles" as used herein refers to vehicles which exist on the main or interflow lane and travel in the same direction as the travel direction of the subject vehicle M. FIG. 6 is a diagram for defining a relationship between the relative information of other vehicles and the satisfaction of the condition C1. If the relative information is found in a region indicated as "automatic interflow is not permitted" in FIG. 6, that is, the region where the relative distance is short or the distance between vehicles decreases, the condition C1 is satisfied. On the contrary, if the relative information is found in the region indicated as "automatic interflow is permitted", that is, in the region where the relative distance is long or the distance between vehicles increases, the condition C1 is not satisfied.

The satisfaction of the condition C2 is judged, for example, based on operation time of the blinker lever included in the information on sensor detection. The satisfaction of the condition C3 is judged based on, for example, the speed of the subject vehicle M included in the information on sensor detection. The satisfaction of the condition C3 is judged irrespective of the existence of the other vehicles traveling along the main lane. When the speed of the subject vehicle M is extremely slow, the condition C3 is satisfied. The condition C4 is judged based on, for example, presence or absence of an error signal of the traveling device included in the information on sensor detection.

In the step S10, when any one of the conditions C1 to C4 is satisfied, it is judged that conditions for manual interflow are satisfied. On the contrary, when all of the conditions C1 to C4 are not satisfied, it is judged that conditions for automatic interflow are satisfied. That is, in the processing of the step S10, when all of the following conditions C5 to C8 are satisfied, it is judged that conditions for automatic interflow are satisfied.

C5: There is no other vehicle interfering with the interfluent motion of the subject vehicle M.
C6: The blinker lamp has been lighted for a predetermined time.
C7: The speed of the subject vehicle M at the proximal end of the interflow zone is faster than or equal to the specified speed.
C8: The driving force for travel output device, the steering device and the brake device are not abnormal.

When the judgement result of the step S10 is negative (i.e., when it is judged that all of the conditions C5 to C8 are satisfied), the automatic interflow is started (step S11). Specifically, based on the information on traveling path, control amount of the traveling device 72 is determined so that the subject vehicle M travels along the traveling pas as scheduled. Also, start and end timings of the lighting motion of the lamp device 82 (more precisely, the blinker lamp) are determined based on the information on traveling path.

On the other hand, when the judgement result of the step S10 is positive, it is judged whether or not the conditions for manual interflow are satisfied at the position PNO (step S12). That is, the satisfaction of the conditions for manual interflow is judged again at the timing which the subject vehicle M reaches the position PNO.

When the judgement result of the step S12 is negative (i.e., when it is judged that all of the conditions C5 to C8 are satisfied), the automatic interflow is started (step S11). By the execution of the processing of the step S12, the automatic interflow is started when the conditions for automatic interflow are finally satisfied at the position PNO. In other words, the processing of the step S12 is processing to start the automatic interflow as much as possible within the permission area of the automatic interflow.

On the other hand, when the judgement result of the step S12 is positive, slow gentle deceleration of the subject vehicle M is started (step S13). Specifically, the control amount of the traveling device 72 (more precisely, the operation amount of the brake device) is determined such that the subject vehicle M decelerates at a predetermined target deceleration (e.g., −0.1G).

When the conditions for manual interflow are satisfied at the position PNO, the system abandons the automatic interflow. Therefore, in this case, manual interflow notification is started after the judgement without delay (details will be described later). Therefore, the driver will start an operation for manual interflow. However, when the subject vehicle M reaches the position PGU immediately after that, there is a possibility that driver is required to start rapid deceleration to stop the subject vehicle M at the position PST. Therefore, the gentle deceleration is started in the step S13 as a preparation stage of the rapid deceleration. By starting such gentle deceleration, it is possible to afford secure feeling to the driver with a margin in the handover period of the central player of vehicle control.

Subsequent to the step S13, it is judged whether or not the subject vehicle M has reached the position PGU without the manual interflow being started (step S14). Whether or not the manual interflow is started is judged based on the information on sensor detection, for example. Whether or not the subject vehicle M has reached the position PGU is judged based on the information on sensor detection and the information on interflow, for example. When the judgement result of the step S14 is negative, it is able to judge that the manual interflow has started. Therefore, in this case, the interflow control processing is ended.

On the other hand, when the judgement result of the step S14 is positive, full deceleration with maximum deceleration of the subject vehicle M is started (step S15). Specifically, the control amount of the traveling device 72 (more precisely, the operation amount of the brake device) is determined such that the subject vehicle M decelerates at the maximum deceleration (e.g., −0.6 G).

In the processing of the step S10, when all of the conditions C5 to C8 are satisfied, it is judged that the conditions for automatic interflow are satisfied. However, the condition C5 and the conditions C6 to C8 differ in nature of the condition. In other words, the conditions C6 to C8 depend only on the vehicle state of the subject vehicle M, whereas the condition C5 depends on vehicle states of the subject vehicle M and other vehicles. Therefore, it is assumed that the conditions C6 to C8 have been satisfied whereas the condition C5 has not been satisfied. And, in this case, the conditions for automatic interflow may suddenly be satisfied when the other vehicles recognize the subject vehicle M and make way for the subject vehicle M (e.g., lane change motion or deceleration of the other vehicle). Therefore, in the processing of the step S10, when only the condition C5 is not satisfied (i.e., only the condition C1 is satisfied), it may be temporarily postponed to issue the judgement result.

However, this postponement shall be held at the maximum until the subject vehicle M reaches the position PNO. That is, when the subject vehicle M reaches the position PNO, the postponed state is canceled. After the release of the postponed state, the processing of the step S12 is started. When the postponed state is canceled at the position PNO and the processing of the step S12 is started, it is possible to judge at the position PNO whether or not the conditions for manual interflow (i.e., the conditions C1 to C4) are satisfied. And when it is judged that the condition C5 has not been satisfied, the automatic interflow is abandoned and the gentle deceleration is started (step S13).

2.3 Notification Position Setting Portion 66

The portion 66 executes processing to set a position to start manual interflow notification (hereinafter also referred to as "notification position setting processing") based on the conditions for manual interflow (or the conditions for automatic interflow) and the information on interflow. This notification position setting processing will be described in detail with reference to FIG. 7.

FIG. 7 is a flowchart for describing notification position setting processing according to the first embodiment. In the routine shown in FIG. 7, first, the position PNO is provisionally set (step S20). The position PNO set as provisional is the point described in FIG. 4 (i.e., the point prior to a seconds from which the subject vehicle M traveling at the speed v reaches the position PGU).

Subsequent to the step S20, it is judged whether or not the subject vehicle M has reached the position PNO without starting the automatic interflow (step S21). Whether or not the automatic interflow is started is judged based on the information on sensor detection, for example. Whether or not the subject vehicle M has reached the position PNO is judged based on the information on sensor detection and the information on interflow, for example. If the judgement result of the step S21 is negative, it is able to judge that the automatic interflow has been started. Therefore, in this case, the notification position setting processing is ended.

On the other hand, when the judgement result of the step S21 is positive, it is judged at the position PNO whether or not the conditions for automatic interflow are satisfied (step S22). That is, it is judged whether or not all of the conditions C5 to C8 are satisfied at the timing when the subject vehicle M reaches the position PNO.

When the judgement result of the step S22 is negative, the position PNO is formally set (step S23). The formal position PNO is the same position as the position PNO provisionally set in the step S20. Therefore, when the judgement result in the step S22 is negative, the manual interflow notification is started immediately after the processing of the step S23.

Similarly to the processing of the step S22, the position PNO is also set formally when the judgement result in the step S22 is positive (step S24). However, the formal position PNO is different from the position PNO provisionally set in the step S20. The formal position PNO is, for example, a point prior to R seconds (e.g., 2.0 seconds) from which the subject vehicle M traveling at the speed v reaches the position PGU. Therefore, when the judgement result of the step S22 is positive, the manual interflow notification is not started immediately after the execution of the processing of the step S4 but started after a lapse of several seconds.

As described in the step S12 of FIG. 5, when the conditions for automatic interflow are finally satisfied at the position PNO, the automatic interflow is started after passing through the position PNO. The processing of the step S24 is processing to postpone the start of the automatic interflow as much as possible.

3. Advantageous Effects

According to the vehicle control system according to the first embodiment described above, the following effects are obtained by the interflow control processing and the notification position setting processing. These effects will be described with reference to FIG. 8.

Figure 8:
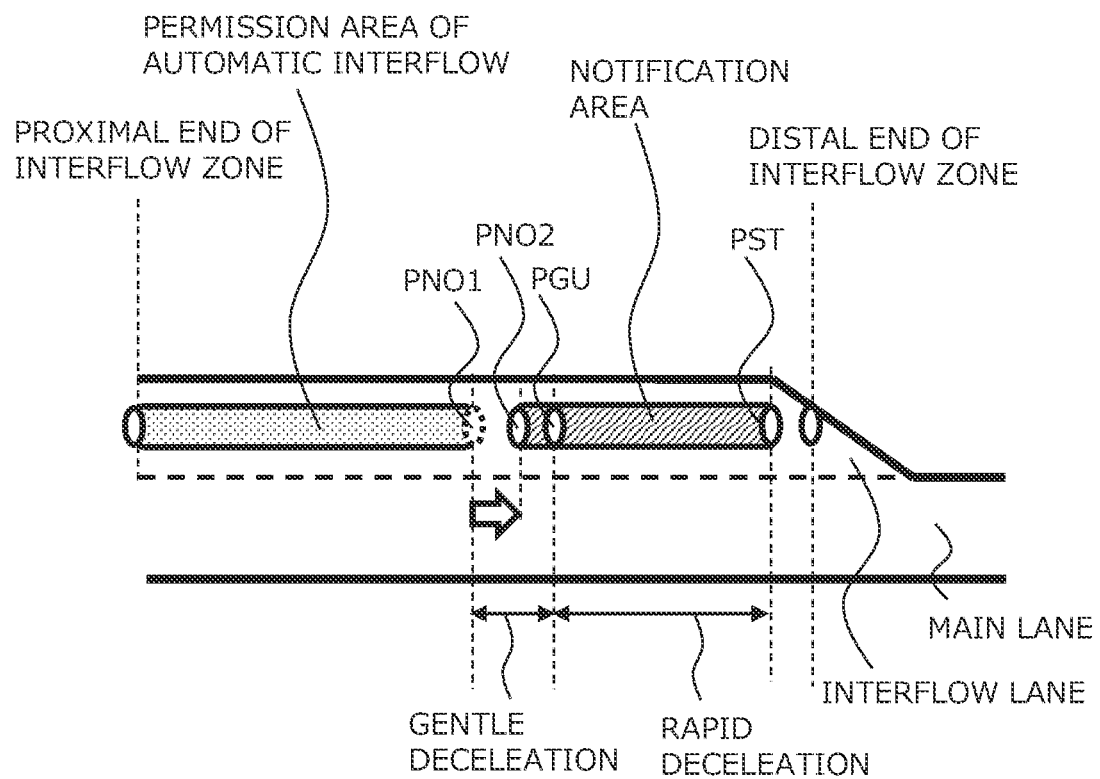
FIG. 8 is a diagram for describing advantageous effects by the processing according to the first embodiment.

The position PNO1 shown in FIG. 8 is the position PNO included in the information on manual interflow notification position and corresponds to the position PNO provisionally set in the notification position setting processing. The position PNO2 corresponds to the position PNO that is formally set when conditions for automatic interflow is established at the position PNO1.

According to the interflow control processing, when the conditions for automatic interflow are satisfied in the permission area of the automatic interflow, the automatic interflow is started. Therefore, even if the conditions for automatic interflow are satisfied at the timing when the subject vehicle M reaches position PNO1, the automatic interflow is started. According to the notification position setting processing, when the automatic interflow is started at such timing, the manual interflow notification is set to the position PNO2 instead of the position PNO1. That is, start timing of the manual interflow notification is temporarily suspended. Therefore, the automatic interflow is able to start as much as possible within the permission area of the automatic interflow.

In addition, according to the notification position setting processing, the manual interflow notification is started at the position PNO1 when the conditions for automatic interflow has not been satisfied within the permission area of the automatic interflow. Alternatively, the manual interflow notification is started at the position PNO2 when the subject vehicle M has reached position PNO2 even if the conditions for automatic interflow are satisfied. Therefore, when the execution of the automatic interflow is impossible or when the subject vehicle M reaches the position PNO2, it is still possible to prompt the driver to perform safe manual interflow.

Furthermore, according to the interflow control processing, when the subject vehicle M reaches the position PGU without the manual interflow being started, the rapid deceleration of the subject vehicle M is started. Therefore, even if the handover of the central player of the vehicle control is not performed despite the start of the manual interflow notification at the position PNO1 or PNO2, it is possible to make the subject vehicle M stop at the position PST.

Still further, according to the interflow control processing, the gentle deceleration is started at the position PNO1 when the conditions for automatic interflow are not satisfied in the permission area of the automatic interflow. If the conditions for automatic interflow have never been satisfied in the permission area of the automatic interflow, the manual interflow notification is started at the position PNO1. Therefore, if the gentle deceleration is started at the position PNO1, which provides secure feeling to the driver with a margin in the handover period of the central player of vehicle control.

Note that, in the first embodiment, the position PNO1 shown in FIG. 8 corresponds to the "first position" of the first, sixth or eighth aspect. The position PNO2 corresponds to the "second position" of the second or seventh aspect. The position PGU corresponds to the "third position" of the third aspect. The position PST corresponds to the "target position" of the third aspect.

Second Embodiment

Next, a second embodiment of the present disclosure is described with reference to FIGS. 9 to 12. Hereinafter, parts different from the first embodiment and characteristic parts of the second embodiment will be described mainly, and the description overlapping with the first embodiment will be omitted as appropriate.

1. Characteristics in Processing of Second Embodiment

The interflow control processing and the notification position setting processing of the first embodiment is presupposed the information corresponding to the positions PNO, PGU and PST are included in the information on interflow. However, since the shape of the interflow lane is varied, the interflow zone may be short. Therefore, in the case of the method in which the positions PNO, PGU and PST are sequentially set, there is a possibility that the position PNO is located outside the interflow zone when the interflow zone is extremely short. In other words, there is a possibility that the permission area of the automatic interflow is not set at all.

In the second embodiment, therefore, information on whole length of the interflow zone and that of the notification area is added to the information on interflow. The information on whole length of interflow zone and that of the notification area is generated based on, for example, the information on position and orientation and the map information. In the second embodiment, processing to judge on the whole length is executed in the interflow control processing and the notification position setting processing.

1.1 Interflow Control Processing

Figure 9:
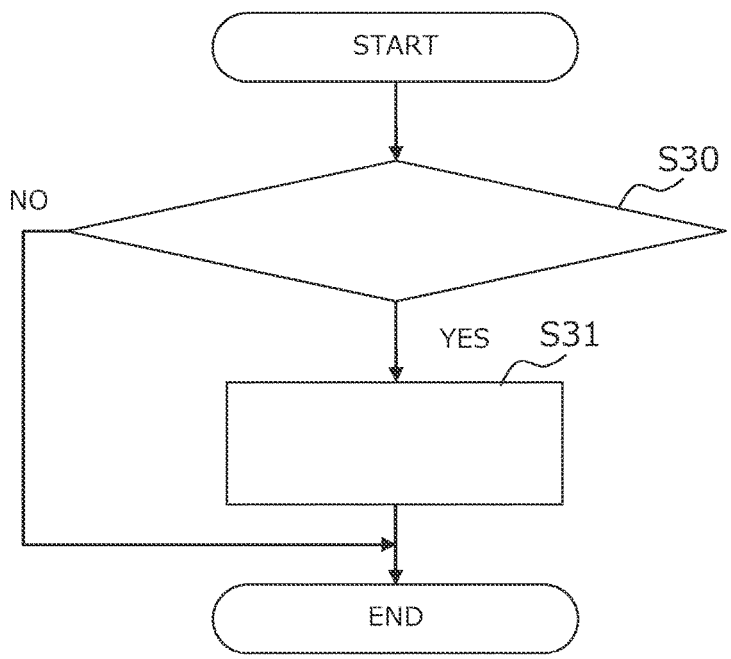
FIG. 9 is a flowchart for describing interflow control processing according to the second embodiment 2.

FIG. 9 is a flowchart for describing the interflow control processing according to the second embodiment. The routine shown in FIG. 9 is repeatedly executed according to a predetermined control period after the subject vehicle M enters the interflow lane and before it reaches the proximal end of the interflow zone.

In the routine shown in FIG. 9, first, it is judged whether or not the whole length of the interflow zone is shorter than that of the notification area (step S30). When the judgement result of the step S30 is negative, it is able to judge that the permission area of the automatic interflow exists. Therefore, in this case, the interflow control processing is ended.

On the other hand, when the judgement result of the step S30 is positive, deceleration of the subject vehicle M is started (step S31). Specifically, the control amount of the traveling device 72 (more precisely, the operation amount of the brake device) is determined such that the subject vehicle M decelerates at a predetermined target deceleration (e.g., a multiplied value from −0.1 G and the number of iterations of this routine after entering the interflow lane). In the determination of the control amount, it is desirable to fine-adjust the target deceleration such that the speed of the subject vehicle M at the proximal end of the interflow zone is equal to or higher than the specified speed (see the condition C7).

When the processing of the steps S30 and S31 is repeated after the subject vehicle M enters the interflow lane and before reaching the proximal end of the interflow zone, the whole length of the notification area is gradually decreased as the deceleration of the subject vehicle M. Then, when the whole length of the notification area is decreased, the position PNO is enable to be set. When it is possible to set the position PNO, it becomes possible to secure the permission area of the automatic interflow in the interflow zone. As described above, the processing of steps S30 and S 31 is processing for securing the opportunity of automatic interflow.

1.2 Notification Position Setting Processing

Figure 10:
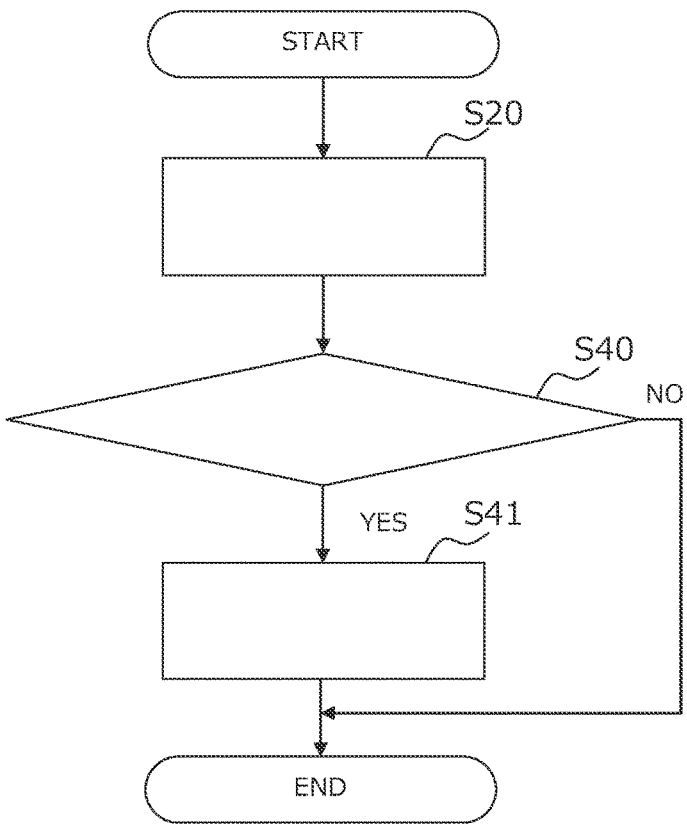
FIG. 10 is a flowchart for describing notification position setting processing according to the second embodiment.

FIG. 10 is a flowchart for describing the notification position setting processing according to the second embodiment. As the routine shown in FIG. 9, the routine shown in FIG. 10 is repeatedly executed in accordance with a predetermined control period after the subject vehicle M enters the interflow lane and before it reaches the proximal end of the interflow zone.

In the routine shown in FIG. 10, it is judged whether or not a value obtained by multiplying the whole length of the notification area by a coefficient C is longer than that of the interflow zone (step S40). The coefficient C is set from 1.0 to 2.0, for example. According to such the coefficient C, it is able to judge whether or not the whole length of the permission area of the automatic interflow is medium. The medium length is not a length that is unfitted for the automatic interflow, but there is a shortage to start the automatic interflow well in advance. When the judgement result of the step S40 is negative, it is able to judge that the whole length of the permission area of the automatic interflow is sufficiently long. Therefore, in this case, the notification position setting processing is ended.

On the other hand, when the judgement result of the step S40 is positive, the position PNO provisionally set in the step S20 is changed (step S41). The changed position PNO is a point prior to y seconds (e.g., 3.0 seconds) from which the subject vehicle M traveling at the speed v reaches the position PGU. The time y is set to an intermediate value between the times $\alpha$ and $\beta$. According to such the time y, the whole length of the permission area of the automatic interflow becomes long. Note that the time y is not necessarily a fixed value and may be changed according to the whole length of the permission area of the automatic interflow. For example, the shorter the whole length of permission area of the automatic interflow, the shorter the time y may be changed.

2. Advantageous Effects

According to the vehicle control system according to the second embodiment described above, the following effects are obtained by the interflow control processing and the notification position setting processing. These effects will be described with reference to FIGS. 11 and 12.

Figure 11:
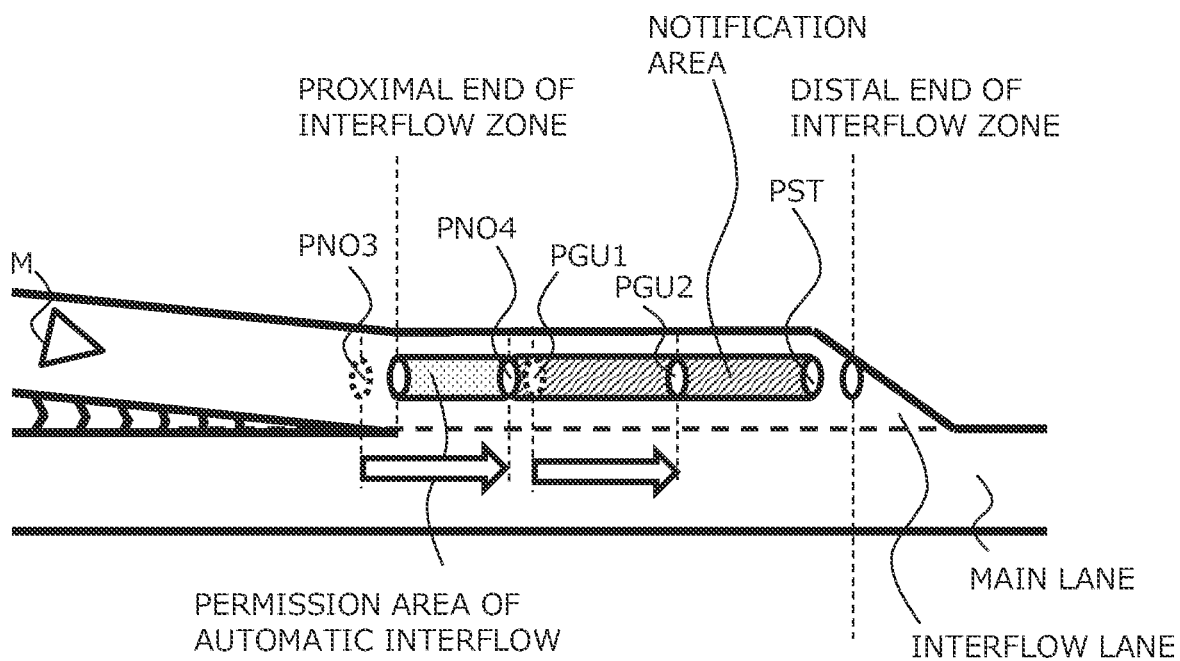
FIG. 11 is a diagram for describing advantageous effects by the processing according to the second embodiment.

The position PGU 1 shown in FIG. 11 corresponds to the position PGU set at a certain timing T1 while the subject vehicle M is traveling along the interflow lane. The position PGU2 corresponds to the position PGU set at a timing T2 after the timing T1. The position PNO3 corresponds to the position PNO which is provisionally set at the timing T1. The position PNO4 corresponds to the position PNO provisionally set at the timing T2.

According to the interflow control processing, when it is judged in front of the interflow zone that the whole length of the interflow zone is shorter than that of the notification area, the deceleration of the subject vehicle M is started. Therefore, as shown in FIG. 11, it is possible to shorten the notification area by moving the position PGU1 to PGU2. As a result, the position PNO 3 is moved to the position PNO4 thereby the permission area of the automatic interflow is enlarged. Therefore, it is possible to secure the permission area of the automatic interflow in the interflow zone. Therefore, it is possible to secure the opportunity of automatic interflow.

Figure 12:
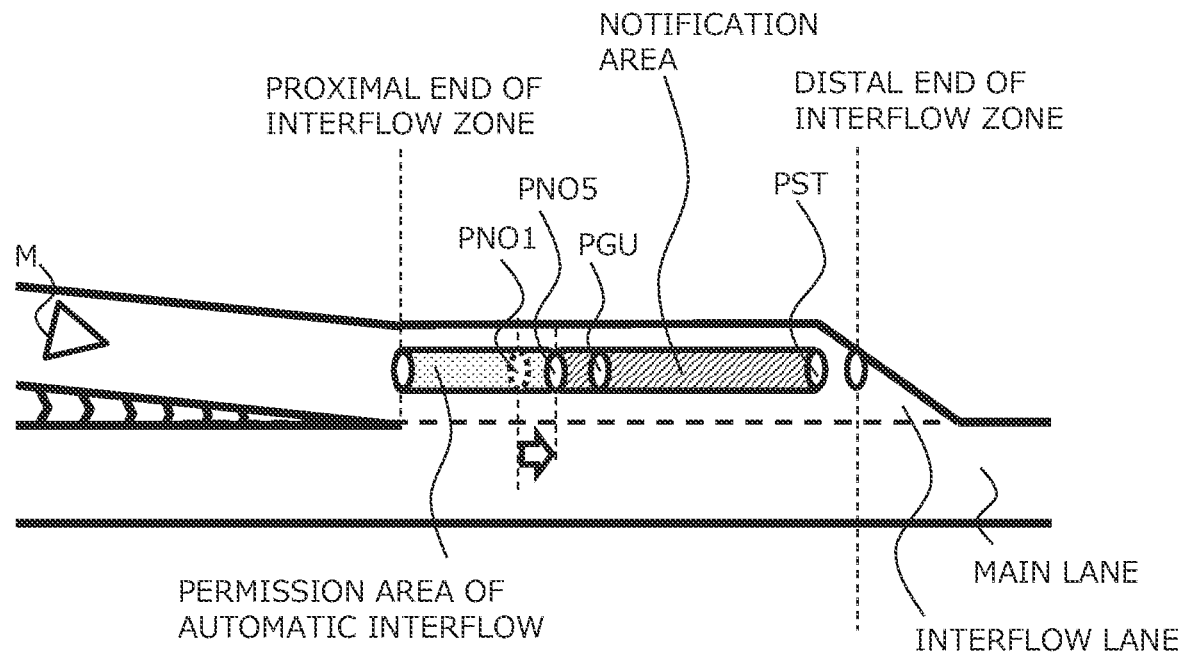
FIG. 12 is a diagram for describing advantageous effects by the processing according to the second embodiment.

The position PNO1 shown in FIG. 12 corresponds to the position PNO provisionally set in the notification position setting processing. The position PNO5 corresponds to the changed position PNO. However, the position PNO5 is a position PNO which is not set formally but is set provisionally. That is, the position PNO5 is formally set at the position PNO when the conditions for automatic interflow have never been satisfied before the subject vehicle M reaches the position PNO5. When the conditions for automatic interflow are finally satisfied at the timing when the subject vehicle M reaches the position PNO5, the position PNO is formally set between the positions PNO5 and PGU instead of the same position PNO5.

According to the notification position setting processing, when the whole length of the permission area of the automatic interflow is medium, the position PNO which was set provisionally is changed from the position PNO1 to the position PNO5. Therefore, it is possible to increase the whole length of the permission area of the automatic interflow and to secure the opportunity to start the automatic interflow.

In particular, according to the second embodiment, even when it is judged in front of the interflow zone that the whole length of the interflow zone is shorter than that of the notification area, it is possible to secure the permission area of the automatic interflow in the interflow zone owing to a combination of the deceleration of the subject vehicle M based on the interflow control processing and the change of the position PNO based on the notification position setting processing. Therefore, it is possible to increase the opportunity to start the automatic interflow.

Other Embodiments

The vehicle control system according to the above-described embodiments may be modified as follows.

In the interflow control processing according to the first embodiment, when the judgement results of the steps S10, S12 and S14 of FIG. 5 are all positive, the deceleration with the maximum deceleration of subject vehicle M is started in the step S15. However, as is clear from the definition that the subject vehicle M gives up the automatic interflow at the position PGU, even when the deceleration with the maximum deceleration is started only on a condition is satisfied where the subject vehicle M has reached the position PGU. That is, when the subject vehicle M reaches the position PGU, the deceleration with the maximum deceleration may be started regardless of the processing flow described with reference to FIG. 5.

What is claimed is:

1. A vehicle control device which is configured to control automatic interflow of a subject vehicle from an interflow lane to a main lane,
    wherein the vehicle control device comprising:
    a processor; and
    a memory device in which a computer-executable program is stored,
    wherein, when the program is executed by the processor, the processor is configured to:
    judge whether or not a predetermined condition for automatic interflow is satisfied when the subject vehicle reaches a first position of an interflow zone within the interflow lane; and
    start to execute a notification for urging manual interflow by a driver when it is judged that the condition for automatic interflow is not satisfied at the first position, while starting to execute the automatic interflow when it is judged that the condition for automatic interflow is satisfied at the first position.

2. The vehicle control device according to claim 1,
    wherein, when the program is executed by the processor, the processor is further configured to:
    during the subject vehicle travels along the interflow lane, set the first position based on map information and information on position and orientation of the subject vehicle;
    judge whether or not a predetermined condition for automatic interflow is satisfied when the subject vehicle reaches a position located in front of the first position; and
    start to execute the automatic interflow when it is judged that the condition for automatic interflow is satisfied at the position in front of the first position,
    wherein the judgement at the first position as to whether or not the condition for automatic interflow is satisfied is executed when it is judged that the condition for automatic interflow is not satisfied at the position in front of the first position.

3. The vehicle control device according to claim 1,
    wherein, when the program is executed by the processor, the processor is further configured to:
    during the subject vehicle travels along the interflow lane, set the first position based on map information and information on position and orientation of the subject vehicle;
    continuously judge whether or not a predetermined condition for automatic interflow is satisfied before the subject vehicle reaches the first position; and
    start to execute the automatic interflow when it is judged that the condition for automatic interflow is satisfied before the subject vehicle reaches the first position,
    wherein the judgement at the first position as to whether or not the condition for automatic interflow is satisfied is executed when it is judged that the condition for automatic interflow is not satisfied before the subject vehicle reaches the first position.

4. The vehicle control device according to claim 1,
    wherein the condition for automatic interflow includes:
    (i) there is no other vehicle interfering with an interfluent motion of the subject vehicle;
    (ii) a blinker lamp of the subject vehicle has been lighted for a predetermined time;
    (iii) speed of the subject vehicle at a proximal end of the interflow zone is faster than or equal to a specified speed; and
    (iv) a driving force for travel output device of the subject vehicle, a steering device of the subject vehicle and a brake device of the subject vehicle are not abnormal.

5. A vehicle control device according to claim 1,
    wherein, when the processor is further configured to:
    when it is judged that the condition for automatic interflow is satisfied at the first position, temporarily suspend to start to execute the notification while setting a second position between the first position and a distal end of the interflow zone; and
    start to execute the notification when the start of the notification is suspended and the subject vehicle reaches the second position.

6. A vehicle control method to control automatic interflow of a subject vehicle from an interflow lane to a main lane,
    wherein the vehicle control method comprises the steps of:
    judging whether or not a predetermined condition for automatic interflow is satisfied when the subject vehicle reaches a first position of an interflow zone within the interflow lane; and
    starting to execute a notification for urging manual interflow by a driver when it is judged that the condition for automatic interflow is not satisfied at the first position, while starting to execute the automatic interflow when it is judged that the condition for automatic interflow is satisfied at the first position.

7. The vehicle control method according to claim 6,
    wherein the vehicle control method further comprises the steps of:
    when it is judged that the condition for automatic interflow is satisfied at the first position, temporarily suspend to start to execute the notification while setting a second position between the first position and a distal end of the interflow zone; and starting to execute the notification when the start of the notification is suspended and the subject vehicle reaches the second position.

8. A non-transitory computer-readable storage medium that causes a computer to execute process to control automatic interflow of a subject vehicle from an interflow lane to a main lane, wherein the process comprising:

judging whether or not a predetermined condition for automatic interflow is satisfied when the subject vehicle reaches a first position of an interflow zone within the interflow lane; and starting to execute a notification for urging manual interflow by a driver when it is judged that the condition for automatic interflow is not satisfied at the first position, while starting to execute the automatic interflow when it is judged that the condition for automatic interflow is satisfied at the first position.

\* \* \* \* \*